United States Patent
Plagne

(10) Patent No.: US 8,983,175 B2
(45) Date of Patent: Mar. 17, 2015

(54) VIDEO PROCESSING METHOD AND DEVICE FOR DEPTH EXTRACTION

(75) Inventor: Geraud Plagne, Nanterre (FR)

(73) Assignee: Entropic Communications, Inc., San Diego, CA (US)

( * ) Notice: Subject to any disclaimer, the term of this patent is extended or adjusted under 35 U.S.C. 154(b) by 1895 days.

(21) Appl. No.: 12/063,854

(22) PCT Filed: Aug. 10, 2006

(86) PCT No.: PCT/IB2006/052761
§ 371 (c)(1),
(2), (4) Date: Feb. 15, 2008

(87) PCT Pub. No.: WO2007/020570
PCT Pub. Date: Feb. 22, 2007

(65) Prior Publication Data
US 2008/0232716 A1 Sep. 25, 2008

(30) Foreign Application Priority Data

Aug. 17, 2005 (EP) .................................... 05300669

(51) Int. Cl.
*G06K 9/00* (2006.01)
*G06T 7/00* (2006.01)
(52) U.S. Cl.
CPC .............. *G06T 7/0051* (2013.01); *G06K 9/00* (2013.01); *G06T 7/0071* (2013.01)
USPC ........... 382/154; 382/166; 382/232; 382/233; 382/235; 382/244; 382/285
(58) Field of Classification Search
USPC .................. 382/166, 232, 233, 235, 244, 285
See application file for complete search history.

(56) References Cited

U.S. PATENT DOCUMENTS

| | | | | |
|---|---|---|---|---|
| 5,537,488 A | * | 7/1996 | Menon et al. ................. | 382/170 |
| 5,619,337 A | * | 4/1997 | Naimpally .................... | 386/329 |
| 5,825,927 A | * | 10/1998 | Boyce et al. .................. | 382/232 |
| 5,920,572 A | * | 7/1999 | Washington et al. ......... | 370/535 |

(Continued)

FOREIGN PATENT DOCUMENTS

| EP | 1379063 A1 | 1/2004 |
|---|---|---|
| WO | 2004061765 A2 | 7/2004 |

OTHER PUBLICATIONS

Tweed, D; et al "Integrated Segmentation and Depth Ordering of Motion Layers in Image Sequences" MVC2000. Proceedings of the 11th British Machine Vision Conference, vol. 1, Sep. 11, 2000, pp. 322-331.

(Continued)

*Primary Examiner* — Vu Le
*Assistant Examiner* — Aklilu Woldemariam
(74) *Attorney, Agent, or Firm* — Richard Bachand; Ballard Spahr LLP

(57) ABSTRACT

The present invention provides an improved method and device for generating a depth map (112) by extracting three-dimensional depth information from the movement vectors of an encoded video bit stream (102) to display two-dimensional video sequences onto three-dimensional displays. In particular, the invention performs depth extraction (110) by means of a post-processing of the movement vectors of the inter-coded macroblocks, which have been already encoded in the video bit stream, thereby significantly reducing the heavy processing requirements associated with conventional motion estimation techniques.

21 Claims, 5 Drawing Sheets

(56) References Cited

U.S. PATENT DOCUMENTS

| | | | |
|---|---|---|---|
| 6,011,498 A * | 1/2000 | Wittig | 341/67 |
| 6,058,210 A * | 5/2000 | de Queiroz et al. | 382/232 |
| 6,549,660 B1 * | 4/2003 | Lipson et al. | 382/224 |
| 6,574,378 B1 * | 6/2003 | Lim | 382/305 |
| 6,636,222 B1 * | 10/2003 | Valmiki et al. | 345/505 |
| 6,683,980 B1 * | 1/2004 | Meier et al. | 382/166 |
| 6,870,962 B2 * | 3/2005 | Lee et al. | 382/248 |
| 6,925,249 B1 * | 8/2005 | Meier et al. | 386/329 |
| 6,944,350 B2 * | 9/2005 | Budge et al. | 382/240 |
| 7,016,540 B1 * | 3/2006 | Gong et al. | 382/225 |
| 7,035,467 B2 * | 4/2006 | Nicponski | 382/224 |
| 7,152,209 B2 * | 12/2006 | Jojic et al. | 715/720 |
| 7,212,676 B2 * | 5/2007 | Dwyer et al. | 382/233 |
| 7,630,562 B2 * | 12/2009 | Gong et al. | 382/219 |
| 7,693,339 B2 * | 4/2010 | Wittenstein | 382/238 |
| 7,848,430 B2 * | 12/2010 | Valmiki et al. | 375/240.24 |
| 2002/0191844 A1 * | 12/2002 | Lee et al. | 382/166 |
| 2003/0044062 A1 * | 3/2003 | Ganapathy et al. | 382/165 |
| 2004/0096110 A1 * | 5/2004 | Yogeshwar et al. | 382/239 |
| 2005/0063596 A1 * | 3/2005 | Yomdin et al. | 382/232 |
| 2006/0056711 A1 * | 3/2006 | Lee et al. | 382/232 |
| 2008/0292196 A1 * | 11/2008 | Jain et al. | 382/225 |
| 2009/0257649 A1 * | 10/2009 | Yamauchi et al. | 382/165 |

OTHER PUBLICATIONS

Wang, J. Y. A; et al "Representing Moving Images With Layers" IEEE Transactions on Image Processing, vol. 3, No. 5, Sep. 1, 1994, pp. 625-638.

Bergen, L; et al "A Novel Approach to Depth Ordering in Monocular Image Sequences" Proceedings. IEEE Conference on Computer Vision and Pattern Recognition, vol. 2, Jun. 13, 2000, pp. 536-541.

Sawhney, H. S: "3D Geometry From Planar Parallax" Computer Vision and Pattern Recognition, 1994. Proceedings CVPR '94. 1994 IEEE Computer Society Conference on Seattle, WA, Jun. 21, 1994, pp. 929-934.

Cipolla, R; et al "Robust Structure From Motion Using Motion Parallax" Proceedings of the International Conference on Computer Vision. Conference 4, May 11, 1993, pp. 374-382.

Tambankar, A; et al "An Overview of H.264/MPEG-4 Part 10" Video/Image Processing and Multimedia Communications, 2003. 4th EURASIP Conference Focused on Jul. 2-5, 2003, pp. 1-51.

Chen, Y-Y; et al "Deblocking Filter for Low Bit Rate MPEG-4 Video" IEEE Transactions on Circuits and Systems for Video Technology, vol. 15, No. 6, Jun. 2005, pp. 733-741.

* cited by examiner

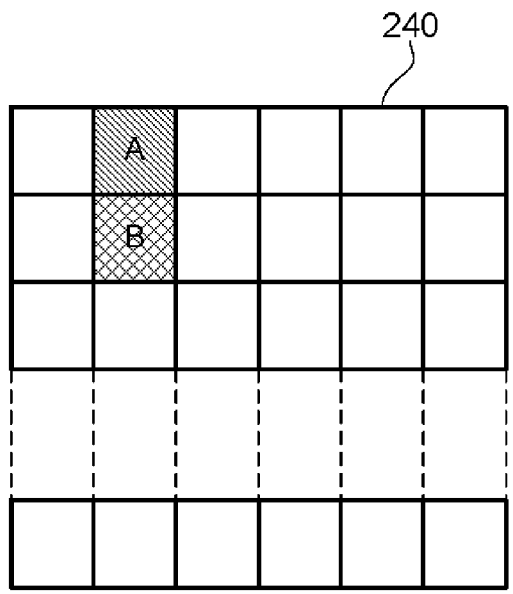
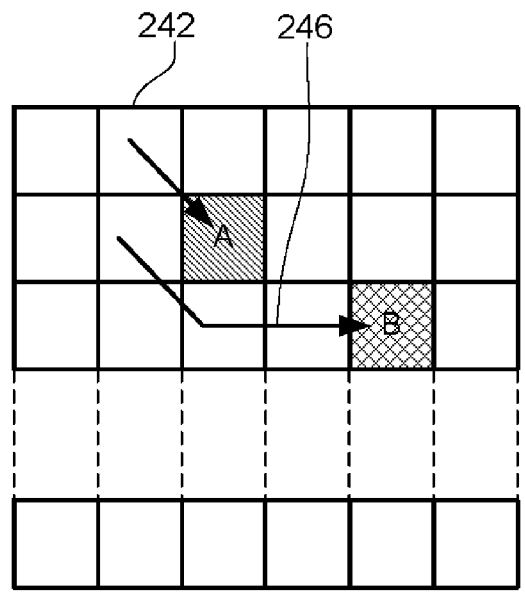
FIG. 5A             FIG. 5B
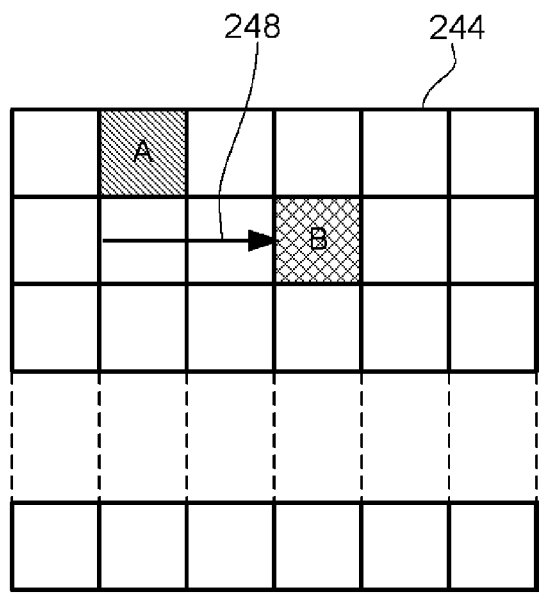
FIG. 5C

VIDEO PROCESSING METHOD AND DEVICE FOR DEPTH EXTRACTION

RELATED APPLICATIONS

This application claims the priority benefits of PCT International Application PCT/IB2006/052761, filed Aug. 10, 2006, which claims priority to European Patent Application No. 05300669.8, filed Aug. 17, 2005.

FIELD OF THE INVENTION

The present invention relates to video processing systems, and in particular, the invention relates to a method and system for rendering three-dimensional image perception onto displays from two-dimensional video sequences.

BACKGROUND OF THE INVENTION

In general terms, displaying and estimating the shape of an object in the real three-dimensional world utilizing one or more two-dimensional images, is a fundamental question in the area of computer vision. The depth perception of a scene or an object is known to humans mostly because the vision obtained by each of our eyes simultaneously could be combined and formed the perception of a distance. However, in some specific situations, humans could have a depth perception of a scene or an object with one eye when there is additional information, such as lighting, shading, interposition, pattern or relative size. That is why it is possible to estimate the depth of a scene or an object with a monocular camera, for example.

New lenticular liquid crystal display (LCD) technology allows the display of still and moving pictures with a three-dimensional user perception without the use of stereo three-dimensional glasses, for example. In other words, in a three-dimensional LCD, a sheet of cylindrical lenses (lenticulars) is placed on top of an LCD in such a way that the LCD image plane is located at the focal plane of the lenses. This means that the rays from the eye of an observer looking perpendicularly at the lenses are focused on the portion of the LCD that is in the middle under each lens. Similarly, the rays from an eye looking at the screen from a sideways angle are concentrated on the LCD off-centre underneath each lens. If the LCD underneath each lens is divided into different sub-pixels, then eyes looking at the screen under different angles see different pixels. Furthermore, if the correct image information is put on the different pixels (i.e., a stereo pair of images), then the observer will see three-dimensionally. Therefore, the image processing and LCD driving requires that a depth map be provided together with the flat 2D pictures.

With the continuing increase of the three-dimensional display market, not all video content can become "three-dimensional" at once. Therefore, there is a strong need and desire for developing three-dimensional techniques, which can provide users the ability to interpret two-dimensional information in a three-dimensional sense. Reconstruction of three-dimensional images or models from two-dimensional video sequences has important ramifications in various areas, with applications to recognition, surveillance, site modelling, entertainment, multimedia, medical imaging, video communications, and a myriad of other useful technical applications. This pseudo-three-dimensional case consists in extracting the relevant depth information from flat video contents. Specifically, depth extraction from flat two-dimensional content is an ongoing field of research and several techniques are known. For instance, there are known techniques specifically designed for generating depth maps based on the movements of the objects in question.

A common method of approaching this problem is analysis of several images taken at the same time from different view points, for example, analysis of disparity of a stereo pair or from a single point at different times, for example, analysis of consecutive frames of a video sequence, extraction of motion, analysis of occluded areas, etc. Others techniques yet use other depth cues like defocus measure. Still other techniques combine several depth cues to obtain reliable depth estimation.

For example, EP 1 379 063 A1 to Konya discloses an example of depth extraction from two-dimensional images based on image segmentation. In particular, it describes a mobile phone that includes a single camera for picking up two-dimensional still images of a person's head, neck and shoulders, a three-dimensional image creation section for providing the two-dimensional still image with parallax information to create a three-dimensional image and a display unit for displaying the three-dimensional image.

However, the conventional techniques described above for three-dimensional design are not often satisfactory due to a number of factors. Systems that propose to extract depth from two-dimensional video sequences are mostly based on temporal motion estimation, which assumes generally that a closer object will have the highest movement. This implies a very computationally intensive process, requiring heavy computational analysis. Moreover, conventional three-dimensional design approaches fall short with systems based on defocus analysis when there is no noticeable focussing disparity, which is the case when pictures are captured with very short focal length optics, or poor quality optics, which is likely to occur in low-cost consumer devices, and systems combining several clues are very complex to implement and hardly compatible with a low-cost platform. As a result, lack of quality, robustness, and increased costs contribute to the problems faced in these existing techniques. Therefore, it is desirable to generate depth perception for three-dimensional imaging from two-dimensional objects such as video and animated sequences of images using an improved method and system which avoids the above mentioned problems and can be less costly and simpler to implement.

SUMMARY OF THE INVENTION

Accordingly, it is an object of the present invention to provide an improved method and device to process video images by providing depth extraction from a two-dimensional encoded video bit stream to display two-dimensional video sequences onto three-dimensional displays by extracting three-dimensional parallax information from movement vectors of the encoded video bit stream.

In particular, the invention provides a method of processing video images by receiving an encoded video bit stream of a two-dimensional video application having video images; decoding movement associated with frames of the encoded video bit stream to extract the movement vectors by block units of the frames; generating a movement map; processing the movement map generated using the movement vectors by grouping block units having similar types of movement vectors into respective areas such that block units having the similar types of movement vectors are grouped together into the respective areas, where the block units in the respective areas include a respective depth information; applying a depth extraction step by integrating the depth information of the respective areas of the movement map based on the types of movement vectors associated with the block units of the video images; and generating a depth map to render two-dimensional video applications onto a three-dimensional display.

One or more of the following features may also be included.

In one aspect, the method also includes performing a gap filling step where the movement vectors of the frames are extrapolated from the movement vectors decoded from a previous frame, duplicated from the movement vectors decoded from the previous frame, or interpolated using the movement vectors from the neighboring frames.

In another aspect, the decoding movement step includes decoding the movement vectors included in compressed video streams according to a video compression standard. In yet another aspect, the video compression standard is the Moving Picture Experts Group standard, and the frames of the encoded video bit stream include frames of "I", "P", or "B" types.

Other features of the video processing method are further recited in the dependent claims. The invention also relates to a video device configured to process video images for three-dimensional display that includes a receiving module configured to receive an encoded video bit stream of a two-dimensional video application having video images; a video decoder configured to decode movement associated with frames of the encoded video bit stream to extract movement vectors by block units of the frames; a module configured to process the movement map generated using the movement vectors by grouping block units having similar types of movement vectors into respective areas such that block units having the similar types of movement vectors are grouped together into the respective areas, where said block units in said respective areas include a respective depth information; a depth extraction module configured to integrate the depth information of the respective areas of the movement map based on the types of movement vectors associated with the block units of the video images; and a module configured to generate a depth map to render two-dimensional video applications onto a three-dimensional display.

One or more of the following features may also be included.

In one aspect, the device is a digital mobile telephone.

In another aspect, the device is a movie player.

The device may further include a gap filling module configured to extrapolate the movement vectors from the movement vectors decoded from a previous frame.

Moreover, video decoder decodes the movement vectors included in compressed video streams according to a video compression standard. The video compression standard is the Moving Picture Experts Group standard.

Other features of the video processing device are further recited in the dependent claims. The invention also relates to a computer-readable medium having a sequence of instructions executed by a microprocessor of the device that causes the processor to receive an encoded video bit stream of a two-dimensional video application having video images; decode movement associated with frames of the encoded video bit stream to extract movement vectors by block units of the frames; generate a movement map; process the movement map generated using the movement vectors by grouping block units having similar types of movement vectors into respective areas such that block units having the similar types of movement vectors are grouped together into said respective areas, where the block units in the respective areas include a respective depth information; apply a depth extraction step by integrating the depth information of the respective areas of the movement map based on the types of movement vectors associated with the block units of the video images; and generate a depth map to render two-dimensional video applications onto a three-dimensional display. Still further objects and advantages of the present invention will become apparent to one of ordinary skill in the art upon reading and understanding the following drawings and detailed description of the preferred embodiments. As it will be appreciated by one of ordinary skill in the art, the present invention may take various forms and may comprise various components and steps and arrangements thereof.

Accordingly, these and other aspects of the invention will become apparent from and elucidated with reference to the embodiments described in the following description, drawings and from the claims, and the drawings are for purposes of illustrating a preferred embodiment(s) of the present invention and are not to be construed as limiting the present invention.

BRIEF DESCRIPTION OF THE DRAWINGS

FIGS. 5A-5C illustrates exemplary frames corrected during the image stabilization step described in FIG. 4.

DESCRIPTION OF THE PREFERRED EMBODIMENTS

Figure 1:
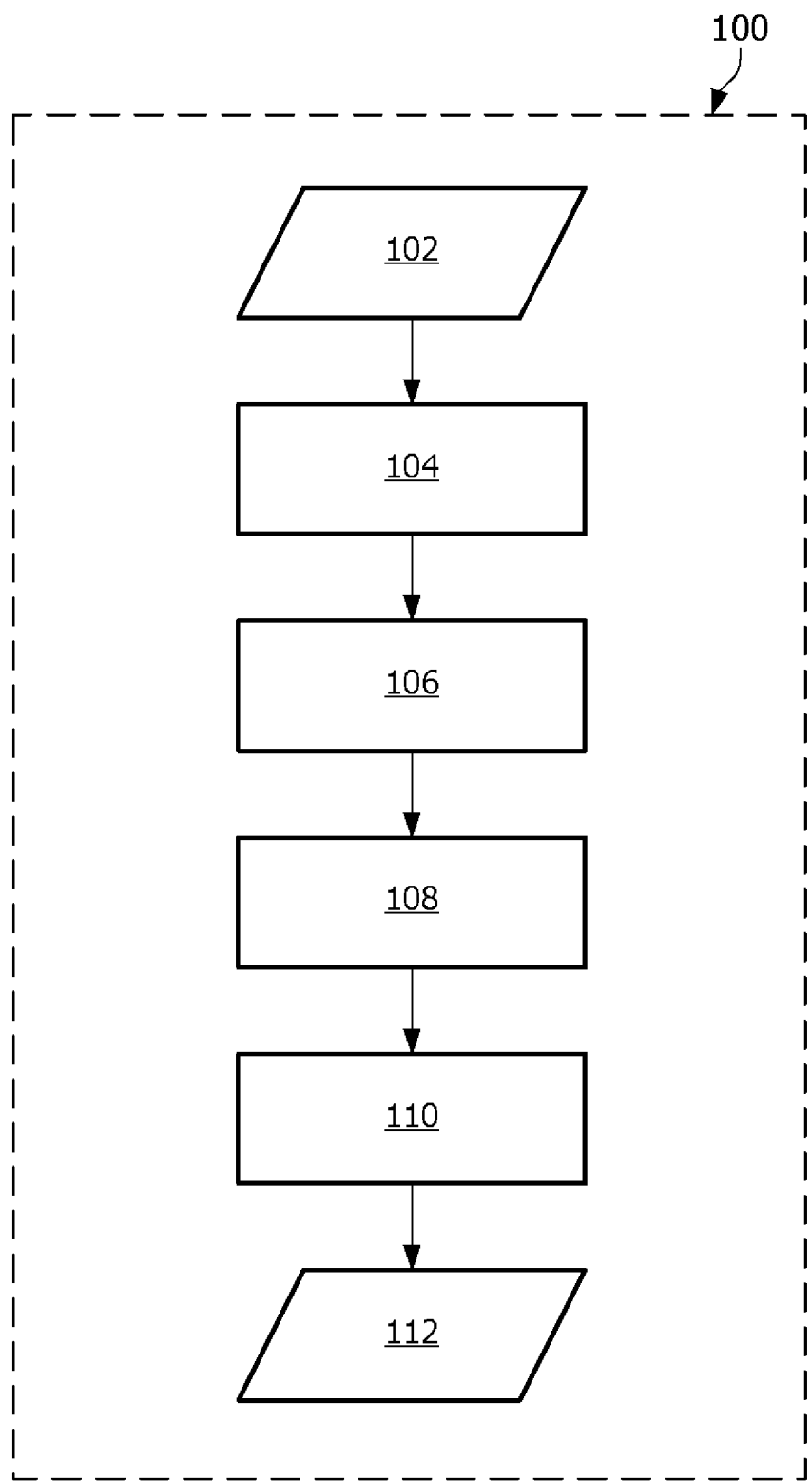
FIG. 1 is a flowchart illustrating an improved method generating a depth map, in accordance with one preferred embodiment of the present invention.

Referring to FIG. 1, a flow chart 100 defines the essential steps of the invention with regards to computing and generating a depth map 112 from a two-dimensional video bit stream 102. The depth map 112, which indicates the depth of a particular area compared to other areas of a two-dimentional video, includes a set of data that is required in order to compute a multi-view rendering of the video before sending sub-pixels to a lenticular LCD monitor, for example. The computing of the multi-view rendering may be integrated on the LCD monitor, although not necessarily.

The method 100 begins with a step 104 of decoding the movement of the two-dimensional content. That is, the content of the two-dimensional video stream 102 is analyzed frame by frame by processing each frame by splitting each frame into several blocks and then associating each block with a movement vector (x, y) defining the movement of the block between a frame and its predecessor. The principle of the movement decoding step 104 can be assimilated into a well-known technique of "movement estimation". Here, the movement vectors are not estimated based on image analysis but decoded from a bit stream video file. Further details will be later described in FIG. 2.

Next, a step 106 of gap filling is performed. In this step 106, a distinctive type of processing is performed on a video frame where movement vectors cannot be decoded from the video file as performed in the step 104. In this case, the movement vectors for these types of frames are either extrapolated from the vectors decoded from the previous frames or duplicated from the vectors decoded from previous frame, or interpolated using vectors decoded from neighboring frames. In other words, some "gaps" may have resulted in the movement map that was generated during the step 104.

Subsequently, a step 108 of movement map processing is carried out. In this step, a map of the video is computed based on the compilation of all the movement vectors collected during the steps 104 and 106. Family of blocks with similar movement vectors are regrouped into distinct areas so that all the blocks belonging to the same area have homogeneous movement patterns.

Next, a step 110 of depth extraction follows. Here, the depth associated with each area is computed based on the fact that the higher the movement, the closer is the object. Essentially, each area of the movement map is characterized by movement. The analysis of the movement within the frames can determine the moving speed of each area. Therefore, areas in the movement map with higher motion are given a closer depth, whereas areas with lower motion are given a depth farther away than the areas which are closer. As a result, the depth map 112 is built by affecting depth information to all the moving areas of the video sequence.

Figure 2A:
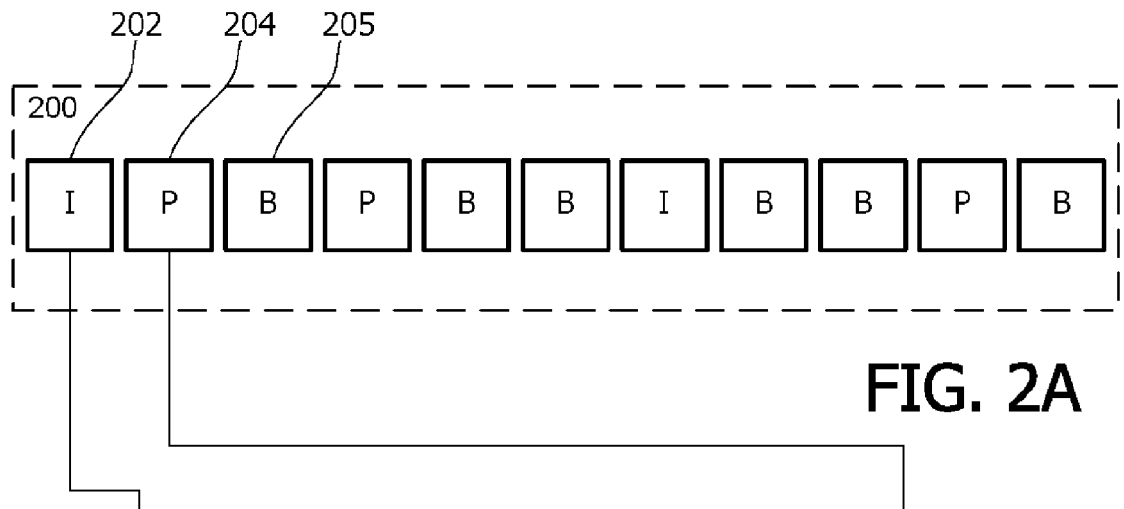
FIGS. 2A-2C is a schematic diagram illustrating a process of movement decoding, in accordance with one preferred embodiment of the present invention.
Figure 2B:
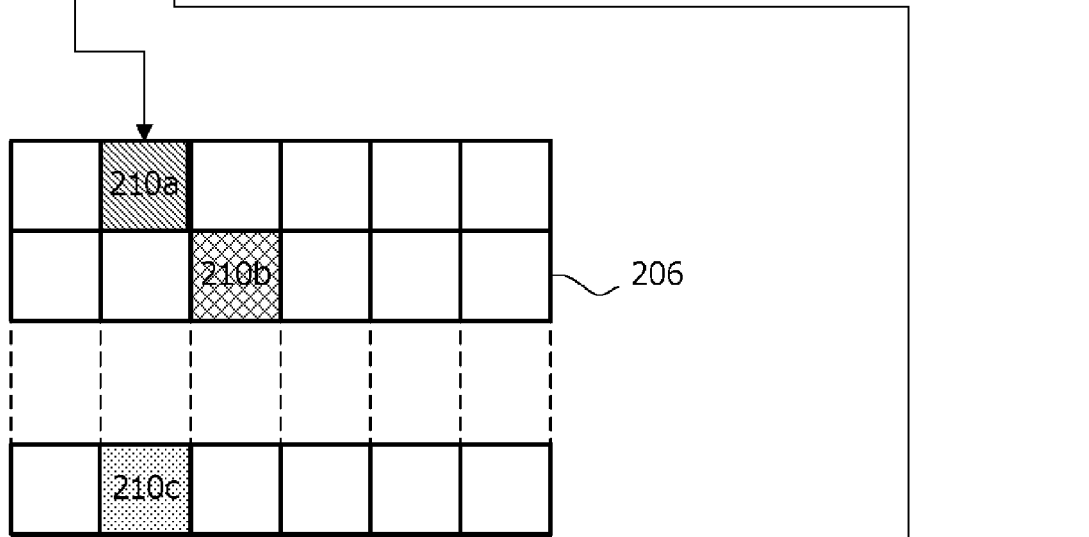
Figure 2C:
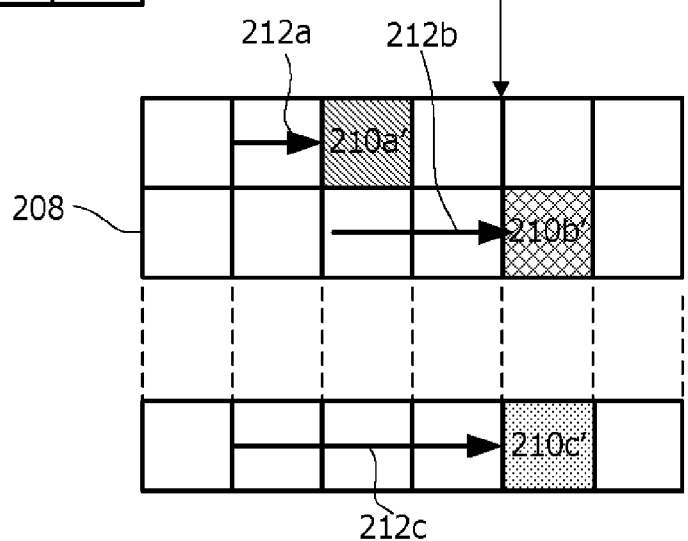

Referring now to FIGS. 2A-2C, a process of movement decoding is diagrammatically illustrated. As described earlier, in order to perform movement estimation, prior art techniques define how to process the content of a video, frame by frame, to compute motion estimation of each block. This process is very time consuming and requires a processor with high processing power in order to perform motion estimation in real time.

In the present invention, motion estimation is performed not by analyzing the video itself as disclosed by prior art designs, but by decoding the movement vectors included natively in all compressed video streams, which are compressed according to a video encoded standard such as MPEG2, MPEG4, and the like. As extraction of the movement vector is provided by an external video decoder (i.e., commonly the video decoder of the player decoding the video) and the data amount is small, the processing overhead for three-dimensional rendering is limited.

To elucidate the step of movement decoding 104 as shown in FIG. 1, the case where MPEG-1 is being used as the compressed format for coding a two-dimensional video stream is for example considered. A MPEG-1 video includes a sequence of three different types of frames: I-Frames, P-Frames and B-Frames. In FIG. 2A, a frame sequence of an exemplary MPEG video 200 is shown as "I P B P B B I B B P B." I-Frames such as 202 are said to be intra-coded because they can be reconstructed without any reference to other frames: the content of the image is completely encoded in this frame and it is possible to reconstitute it only on the basis of information coded in the I-Frames. On the other hand, P-Frames such as 204 are forward predicted from the last I-Frame or P-Frame. Thus, it is impossible to reconstruct them without having the data of another frame (I, P or B-Frames). B-frames such as 205 have characteristics of both I and P-Frames, that is, they are forward predicted and backward predicted from the last/next I-frame or P-Frame, in that there are two other frames necessary to reconstruct them. Consequently, P-Frames and B-Frames are referred to as being inter-coded frames.

FIG. 2B illustrates an I-Frame (then called 206) from the MPEG-1 video 200. The frame is split into a number of blocks. In particular, blocks 210a, 210b and 210c are shown. Similarly, FIG. 2C illustrates a P-Frame (then called 208) forward predicted from the I-Frame 206. The P-Frame 208 is defined by storing the movement vectors. For example, in the P-Frame 208, block 210a' will not be defined by its content but as a movement vector 212a (+1, 0) from block 210a (FIG. 2B), fully defined in the I-Frame 206. Similarly, for block 210c', whose description in the P-frame 208 is reduced to a movement or motion vector 212c (+3, 0). Therefore, the step of movement decoding 104 allows movement estimation to be performed by decoding the movement vectors (212a, 212b, 212c) included in the compressed video file. This step involves less CPU processing and is also more accurate because the information is collected from the video stream source itself and does not have to be computed based on any complex image processing steps. Further, the method of the present invention can be extended and implemented into any video stream encoding algorithm supporting movement vectors, which is the case for most of the compressed video streams in use today. The method of the present invention could also be extended from a system standpoint. The MPEG standard could be diverted to include depth information encoded as a movement vector. This would reduce the picture compression efficiency, but allow embedding of a true sub-resolution (block size) depth information for two-dimensional/three-dimensional (2D-3D) aware video decoders while preserving the compliancy to the standard and keeping the compatibility with the classical decoders. The process of post-processing is described further in FIG. 4. In order to specify if the movement map should be considered as a "true" depth map or if it should be post-processed as described in FIG. 4, one can use, for example, the FOURCC code (Four Character Code) that is commonly used to identify the video codec and pixel format. In FOURCC, the four letters identify which codec the video stream contained in a video file is encoded with (e.g., DIV5, HFYU, XVID, and etc.). In the present invention, the FOURCC code may indicate whether the movement map should be considered as a "true" depth map or it should be post-processed.

Figure 3A:
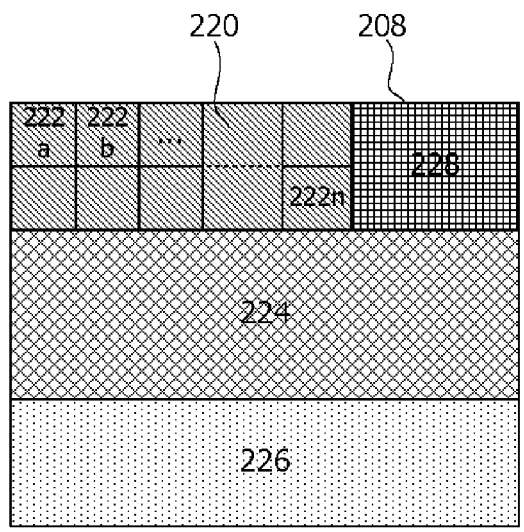
FIGS. 3A-3C illustrates movement maps and a depth map, in accordance with one preferred embodiment of the present invention.
Figure 3B:
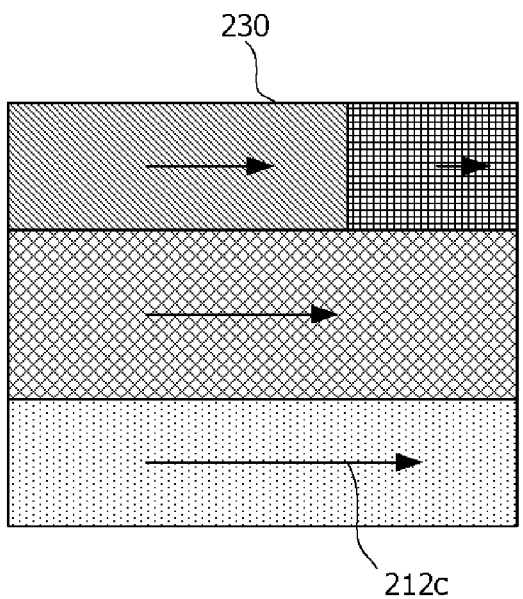
Figure 3C:
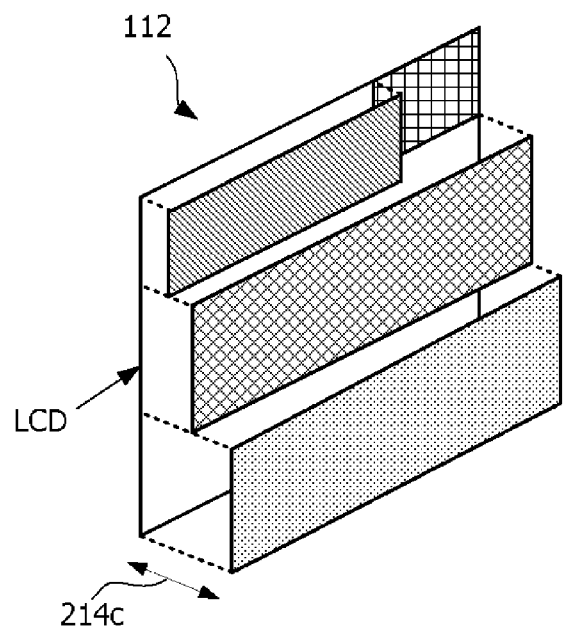

Referring to FIGS. 3A-3C, movement maps and the generation of a depth map are illustrated. As explained previously, a movement map defines families of blocks with similar movement vectors regrouped into distinctly defined areas. All blocks belonging to the same area have homogeneous movements. In FIG. 3A, for example, blocks 222a, 222b . . . 222n include homogeneous movement vectors, which are aggregated into an area 220 of the video frame 208. Similarly, defined areas 224, 226 and 228 include blocks having homogeneous movement vectors. In FIG. 3B, a movement map 230 is shown, where each area of the map is associated with a movement vector, i.e., a movement vector 212c for the area 226.

Figure 4:
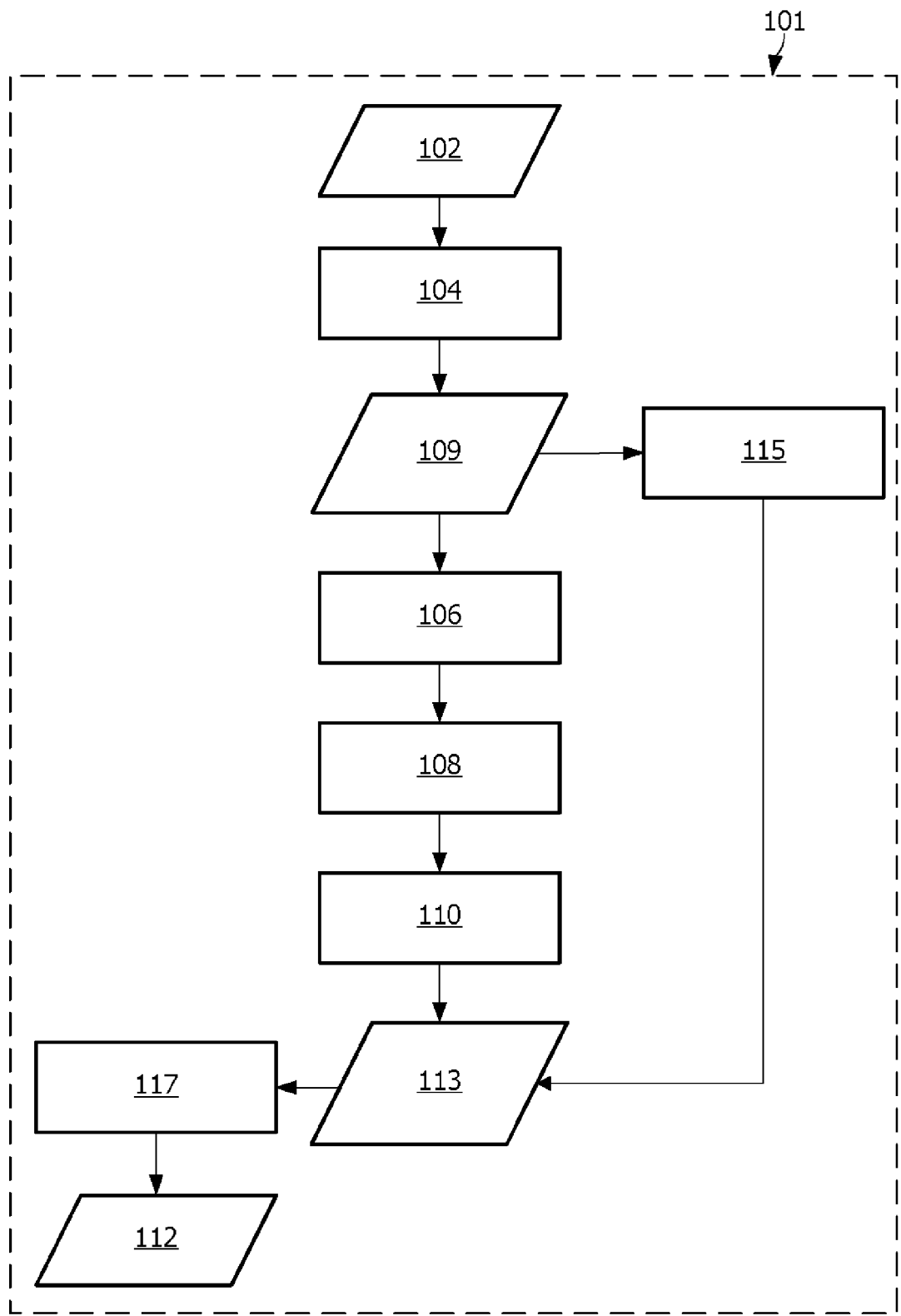
FIG. 4 is a flowchart of another embodiment of an improved method for generating a depth map, in accordance with another preferred embodiment of the present invention.

FIG. 3C shows a depth map 112 that can be computed and generated by performing the depth extraction step 110 of method 100. This involves converting the vector movement 212c, for example, into a depth value 214c based on the assumption that an object having higher movement and motion must be closer and thus have less depth, as given by the following relation: $D=1/M$, where D represents the depth and M represents the movement. Therefore, the depth map 112 can be directly translated from the movement map 230 and processed by a lenticular LCD, as illustrated in FIG. 3C, where an observer/user can distinguish the different areas of the movement map 230 that can be rendered with three-dimensional perception. Referring now to FIG. 4, an improved method 101 derived from the method 100 of FIG. 1 is illustrated. In the method 101, two steps, namely, a step 115 of image stabilization and a step 117 of depth filtering have been incorporated.

Once a map of movement vectors 109 is generated from the movement decoding step, the step 115 of image stabilization attributes to the two-dimensional video stream an overall translation and rotation movement. Image stabilization algorithm is commonly used to reduce the impact of parasitic movements while taking the video (e.g., hand shaking). The impact of incorporating the step 114 of image stabilization will be further explained in FIG. 5. In the method 101, the depth map 112 is generated after being post-processed using a deblocking filter. The reconstructed images from compressed MPEG data have perceivable image degradation, such as blocking effects, ringing effects and corner outliers. Deblocking algorithms remove the blocking artifacts without degrading the sharpness in the picture content. Compare to the method 100, in the method 101, the depth extraction step 110 now generates a rough depth map 113 that can be filtered using a deblocking filter (step 117). In the method 100, no post processing was performed and the result of the depth extraction step 110 was directly the final depth map 112.

Referring to FIGS. 5A-5C, the consequences of the step 115 of image stabilization on movement vectors is illustrated. This can be shown by focusing on block A and block B of a frame 240, whose locations are shown in FIG. 5A. In a following P-frame 242, shown in FIG. 5B, a movement vector (+1, +1) is attributed to block A and a movement vector 246 (+3, +1) is attributed to block B. However, although it appears that there is movement associated with block A, block A is not moving and movement of block A is caused by movement of a camera taking the video such as hand-shaking. The image stabilization algorithm would then indicate that a corrective translation of (−1, −1) and a rotation of 0 degree should be applied to obtain the real movement vector. Accordingly, FIG. 5C shows a corrected location of block A and block B in a B-Frame 244 using the information provided by the stabilization algorithm. In fact, the movement vector for block A is corrected to (0,0) that is accurate since block A did not move. A corrected movement vector 248 for block B is set as (+2, 0).

Therefore, the example of FIGS. 5A-5C demonstrates the importance of image stabilization correction for a correct determination and generation of the depth map 112. Without this correction, blocks A and B would have been allocated to an inaccurate area of the movement map. Thus, this would have been affected a wrong value in the depth map. Ultimately, the consequence would have been an inaccurate rendering on the three-dimensional LCD display.

While there has been illustrated and described what are presently considered to be the preferred embodiments of the present invention, it will be understood by those of ordinary skill in the art that various other modifications may be made, and equivalents may be substituted, without departing from the true scope of the present invention.

In particular, although the foregoing description related mostly to handheld video recording devices, the three-dimensional rendering method described can be applied to any type of video applications, such as in those implemented on computer screens, mobile telephony devices, any type of movie player, and any type of platform embedding a three-dimensional LCD display, home office platforms such as PC, and the like.

Additionally, many advanced video processing modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims and their equivalents.

The invention claimed is:

1. A method of processing video images, wherein the method comprises:
    receiving an encoded video bit stream of a two-dimensional video application having video images;
    decoding movement associated with a plurality of frames of the encoded video bit stream to extract a plurality of movement vectors by block units of the plurality of frames;
    generating a movement map based on the extracted plurality of movement vectors by block units of the plurality of frames;
    processing the movement map generated using the plurality of movement vectors by grouping block units having similar types of movement vectors into respective areas such that block units having the similar types of movement vectors are grouped together into said respective areas, wherein said block units in said respective areas comprise a respective depth information;
    applying a depth extraction step by integrating the depth information of the respective areas of the movement map based on the types of movement vectors associated with the block units of the video images; and
    generating a depth map to render two-dimensional video applications onto a three-dimensional display.

2. The method of claim 1, further comprising performing a gap filling step, wherein said plurality of movement vectors of the plurality of frames are:
    extrapolated from said plurality of movement vectors decoded from a previous frame;
    duplicated from said plurality of movement vectors decoded from the previous frame; or
    interpolated using said plurality of movement vectors from a plurality of neighboring frames.

3. The method of claim 1, wherein the decoding movement step comprises decoding said plurality of movement vectors included in compressed video streams according to a video compression standard.

4. The method of claim 3, wherein the video compression standard comprises the Moving Picture Experts Group standard.

5. The method of claim 1, wherein said plurality of frames of the encoded video bit stream comprises frames of "I", "P", or "B" types.

6. The method of claim 1, wherein the depth extraction step comprises converting information from said plurality of movement vectors into a depth value according to the relation $D=1/M$, wherein D represents said depth value and M represents said movement associated with the plurality of frames.

7. The method of claim 1, further comprising a stabilization step comprising correcting translation and rotational movement of said plurality of movement vectors resulting from parasitic movements of video applications.

8. The method of claim 1, further comprising a depth filtering step that generates a rough depth map and filters the rough depth map using a deblocking filter to counter perceivable image degradation effects of the video images from the encoded video bit stream.

9. The method of claim 1, wherein generating the depth map for a three-dimensional display comprises displaying the depth map onto a lenticular liquid crystal display.

10. A video device configured to process video images for three-dimensional display, wherein the device comprises:

a receiving module configured to receive an encoded video bit stream of a two-dimensional video application having video images;

a video decoder configured to decode movement associated with a plurality of frames of the encoded video bit stream to extract a plurality of movement vectors by block units of the plurality of frames;

a module configured to process a movement map generated using the plurality of movement vectors by grouping block units having similar types of movement vectors into respective areas such that block units having the similar types of movement vectors are grouped together into said respective areas, wherein said block units in said respective areas comprise a respective depth information;

a depth extraction module configured to integrate the depth information of the respective areas of the movement map based on the types of movement vectors associated with the block units of the video images; and a module configured to generate a depth map to render two-dimensional video applications onto a three-dimensional display.

11. The device of claim 10, where in the device is a digital mobile telephone.

12. The device of claim 10, where in the device is a movie player.

13. The device of claim 10, wherein the device further comprises a gap filling module configured to extrapolate said plurality of movement vectors from said plurality of movement vectors decoded from a previous frame.

14. The device of claim 10, wherein the video decoder decodes said plurality of movement vectors included in compressed video streams according to a video compression standard.

15. The device of claim 14, wherein the video compression standard is the Moving Picture Experts Group standard.

16. The device of claim 10, wherein said plurality of frames of the encoded video bit stream comprises frames of "I", "P", or "B" types.

17. The device of claim 10, wherein the depth extraction module is configured to convert information from said plurality of movement vectors into a depth value according to the relation $D=1/M$, wherein D is said depth value and M is said movement associated with the plurality of frames.

18. The device of claim 10, wherein the device further comprises a stabilization module configured to correct translation and rotational movement of said plurality of movement vectors resulting from parasitic movements of video applications.

19. The device of claim 10, wherein the device further comprises a depth filtering module configured to generate a rough depth map adapted to be filtered using a deblocking filter to counter perceivable image degradation effects of the video images from the encoded video bit stream.

20. The device of any claim 10, wherein the three-dimensional display is a lenticular liquid crystal display.

21. A non-transitory computer-readable medium stored program comprising a sequence of instructions which, when executed by a microprocessor of the device, causes the processor to:

receive an encoded video bit stream of a two-dimensional video application having video Images;

decode movement associated with a plurality of frames of the encoded video bit stream to extract a plurality of movement vectors by block units of the plurality of frames;

generate a movement map based on the extracted plurality of movement vectors by block units of the plurality of frames;

process the movement map generated using the plurality of movement vectors by grouping block units having similar types of movement vectors into respective areas such that block units having the similar types of movement vectors are grouped together into said respective areas, wherein said block units in said respective areas comprise a respective depth information;

apply a depth extraction step by integrating the depth information of the respective areas of the movement map based on the types of movement vectors associated with the block units of the video images; and generate a depth map to render two-dimensional video applications onto a three-dimensional display.

\* \* \* \* \*